United States Patent [19]

Weber et al.

[11] Patent Number: 5,039,497

[45] Date of Patent: Aug. 13, 1991

[54] PROCESS FOR SEPARATING COPPER FROM AQUEOUS BASE SOLUTIONS

[75] Inventors: Jürgen Weber, Oberhausen; Peter Lappe; Werner De Win, both of Dinslaken, all of Fed. Rep. of Germany

[73] Assignee: Hoechst Aktiengesellschaft, Fed. Rep. of Germany

[21] Appl. No.: 444,724

[22] Filed: Nov. 30, 1989

[30] Foreign Application Priority Data

Dec. 10, 1988 [DE] Fed. Rep. of Germany ....... 3841673

[51] Int. Cl.$^5$ .................. C22B 15/00; C01G 3/00; B01D 11/00
[52] U.S. Cl. ............................ 423/24; 423/DIG. 14
[58] Field of Search ................ 423/24, DIG. 14; 75/101 BE

[56] References Cited

U.S. PATENT DOCUMENTS

| | | | |
|---|---|---|---|
| 3,224,873 | 12/1965 | Swanson | 75/101 BE |
| 3,674,464 | 7/1972 | Chiola et al. | 423/24 |
| 3,761,249 | 9/1973 | Ritcey et al. | 423/24 |
| 4,130,415 | 12/1978 | Nagaraj et al. | 423/24 |
| 4,314,976 | 2/1982 | Stewart et al. | 423/139 |
| 4,500,494 | 2/1985 | Scher | 423/24 |

FOREIGN PATENT DOCUMENTS 2612505 10/1976 Fed. Rep. of Germany .

*Primary Examiner*—Michael Lewis
*Assistant Examiner*—Steven Bos
*Attorney, Agent, or Firm*—Jordan B. Bierman

[57] ABSTRACT

Copper is separated from aqueous basic solutions by extraction with 3-hydroxy-2-alkylalkanaloxime or 2-hydroxymethyl-2-alkylalkanaloxime solution.

37 Claims, No Drawings

PROCESS FOR SEPARATING COPPER FROM AQUEOUS BASE SOLUTIONS

The invention relates to a process for liquid-liquid extraction of copper from aqueous base solutions. Solutions of water-insoluble oximes in water-insoluble organic solvents are used as extracting agents.

BACKGROUND OF THE INVENTION

The use of oximes for extracting copper from aqueous solutions is known. DE-OS 15 33 079 teaches a process fro selective extraction of copper from solutions with a low pH value. The extracting agent used is a mixture of a 2-hydroxybenzophenone oxime and an aliphatic alpha-hydroxyoxime, which is dissolved in a hydrophobic organic solvent. Adding the aliphatic oxime increases the rate of copper extraction.

DE-OS 21 25 095 relates to the selective extraction of copper, nickel, iron, and/or cobalt salts from aqueous solutions with a ketoxime which is dissolved in kerosene, toluene, or xylene. The ketoxime corresponds to the general formula $R-C(=NOH)-R^1$, R being a straight or branched chain alkyl radical with 7 to 11 carbon atoms and $R^1$ denoting a phenyl group carrying an OH group, in the position ortho to the radical $R-C(=NOH_2)-$, and another $R^2$ group. Good results are achieved with solutions containing the copper salt in concentrations of 0.05 to 0.5 moles/liter. A low pH value increases the yield of copper extracted.

According to DE-OS 23 34 901, compounds of the general formula

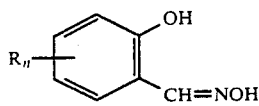

dissolved in organic solvents which are immiscible in water are used for extracting copper and optionally iron, cobalt, and zinc from their aqueous solutions. The process is particularly suitable for separating copper from iron-containing solutions.

DE-OS 26 12 505 describes the separation of copper from acidic solutions by means of liquid-liquid extraction with a mixture of a hydroxyoxime of the general formula $A-C(=NOH)-R$ (where A denotes an aromatic radical substituted in the ortho position by an OH group and R stands for a hydrogen atom or an aliphatic radical) and/or a 2-hydroxybenzophenone oxime as well as another oxime, which are dissolved in an organic solvent.

The known processes for separating copper from aqueous solutions by extraction with oximes do not fulfill all practical requirements. In particular, the completeness of the separation and/or the cost-effectiveness of the extracting agent are not always solved satisfactorily.

Therefore, the problem was to develop a process for extracting copper from aqueous solutions with avoids the above shortcomings and permits near-complete and economic separation of copper.

BRIEF DESCRIPTION OF THE INVENTION

The solution is a process for separating copper from aqueous basic solutions by extraction with an oxime which is dissolved in an organic solvent immiscible in water. The new procedure is characterized in that at least one compound of the following general formulas is used as the oxime:

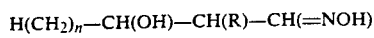

or

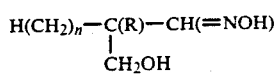

where R stands for an alkyl group with 1 to 8 carbon atoms and n denotes an integer from 2 to 10.

The process according to the invention is characterized by the use of readily accessible oximes which permit nearly complete separation of the copper from its aqueous solution in only a few extraction steps.

DETAILED DESCRIPTION OF THE INVENTION

Of the oximes which are covered by the general formulas, 3-hydroxy-2-ethylhexanaloxime, 3-hydroxy-2-heptylundecanaloxime and 2-hydroxymethyl-2-methylpentanaloxime have proved particularly useful.

In order to prepare the oximes, the hydroxyaldehydes on which they are based are used. The 3-hydroxy-2-alkylalkanals are obtained from alkanals by aldol addition, appropriately in the presence of a secondary amine as a catalyst. Thus, for example, it is particularly easy to obtain 3-hydroxy-2-ethylhexanal from n-butanal with di-n-butylamine as a catalyst. According to a process described in DE-PS 19 57 591, 2-alkyl-2-hydroxymethylalkanals can be prepared from 2-alkylalkanals and formaldehyde in the presence of tertiary amines.

After being separated from the reaction mixture, the aldol can be reacted, without further cleaning, with a hydroxylamine salt, e.g. the sulfate, and alkali hydroxide in aqueous phase. Optionally, the reaction can take place in a gently warmed reaction mixture and then the raw water-insoluble oxime separated from the water phase. The oxime is concentrated in known manner, e.g. using a thin-film evaporator. It has been shown that it is not necessary to use the oxime in extremely pure form. Products of technical purity, which mainly contain the oximes according to the invention but also by-products from aldol addition and oxime formation, have also proved to be admirably suitable for copper separation. Mixtures of the oximes used according to the invention can also be employed.

To perform the extraction, the oximes are dissolved in organic solvents which are immiscible in water. The following are particularly suitable: aliphatic hydrocarbons such as hexane and heptane; low-boiling crude oil fractions of the kerosene type (boiling range 175° to 325° C.); aromatic hydrocarbons such as benzene, toluene, and xylene; chlorinated hydrocarbons such as chloroform, carbon tetrachloride, dichloroethane; and higher alcohols such as n-octanol, isooctanol, isononanol, decanol, and isotridecanol. Isononanol and isotridecanol are particularly suitable solvents.

The concentration of the extracting agent in the extraction solution can be varied over a wide range. It is generally 0.02 to 2 moles/liter, preferably 0.1 to 0.15 moles/liter, based on the extraction solution. It is recommended that the solubility of the oxime in the organic solvent be improved by adding a solubilizer, in particular for the preparation of more highly concentrated solutions. Among the suitable solubilizers for this purpose are aliphatic alcohols with 6 to 18 carbon atoms such as hexanol, n-octanol, i-octanol, isononanol, decanol, isotridecanol. The solubilizers are normally used in an amount of 1 to 25% by weight, preferably 2 to 10% by weight, based on the weight of the extraction solution. Mixtures of hydrocarbons and the above-mentioned alcohols have proven particularly useful.

The copper to be separated is present as a salt in aqueous solution. The concentration of the copper in this solution can range from approximately 0.1 to approximately 1.0% by weight, in particular 0.1 to 0.3% by weight, based on the copper salt solution.

An important feature of the process according to the invention is that the copper salt is extracted from a basic solution. Its pH value is 8 to 12, preferably 9 to 10. With acidic solutions, it is expedient to adjust the desired pH value by adding ammonia, with solutions whose pH value is greater than 12 by adding mineral acids, in particular sulfuric acid.

The ratio of the volumes of extraction solutions and copper salt solution can vary within wide ranges during extraction. In general, the volume ratio of organic extraction solution to aqueous copper salt solution is 1:10 to 5:1, preferably 1:1. The extraction temperature can also vary widely. Normally, extraction takes place at 15° to 60° C. and preferably at 20° to 40° C.

Extraction is performed in known apparatus for liquid-liquid extractions. The aqueous solution to be extracted and the non-aqueous extraction solution are brought into contact continuously or discontinuously by mixing in concurrent or countercurrent flow. After the extraction equilibrium has been established, the phases are separated from each other and purified.

The copper can be recovered from the organic phase according to standard state of the art processes known in the art. According to the invention, it is recommended that the organic copper-containing solution be treated with a dilute aqueous mineral acid solution whose pH value is less than 2, preferably approximately 1. After separation of the aqueous and organic phases, the organic phase is again brought into contact with a mineral acid solution with the same pH value to absorb more copper from the organic solution. The reactions with the mineral acid take place at temperatures of 10° to 30° C., preferably 15° to 25° C. Examples of mineral acids which are useful are hydrochloric acid, sulfuric acid, phosphoric acid, and nitric acid; sulfuric acid is preferred. The concentration of the mineral acid in the diluted aqueous solution is 0.1 to 3.0 moles/liter, preferably 1.5 to 2.0 moles of acid/liter and in particular 0.3 to 0.7 moles/liter. Other substances which are known to improve extraction with oximes can be added to the oxime solution used for extraction. For example, tertiary carboxylic acids of the general formula $R^1R^2C(CH_3)COOH$, $R^1$ being an alkyl radical with 1 to 3 carbon atoms and $R^2$ an alkyl radical with 3 to 5 carbon atoms, have proved useful.

The new process is characterized by rapid establishment of the extraction equilibrium and almost complete extraction of the copper.

The following examples explain the invention without restricting it to these special embodiments.

Preparation of 3-hydroxy-2-ethylhexanaloxime 6.45 g of di-n-butylamine (0.05 moles) is stirred into distilled water in a nitrogen atmosphere and heated to 40° C. Then 720 g of n-butanal (10 moles) and another 6.45 g of di-n-butylamine are added over a period of 30 minutes. The temperature increases to 60° C. After all the reactants have been added, the mixture is stirred for another hour at 60° C. The mixture is cooled to 40° C. and the phases separated. 724 g of raw aldol with the following composition (in % by weight, based on the mixture) is obtained:

| | |
|---|---|
| n-Butanal | 27.8 |
| Di-n-butylamine | 1.8 |
| 2-Ethylhexenal | 1.4 |
| 3-Hydroxy-2-ethylhexanal | 57.0 |
| Other components | 4.0 |
| Water | 8.0 |

The basis for the preparation of 3-hydroxy-2-ethylhexanaloxime is the raw aldehyde.

624 g of hydroxylamine sulfate (3.8 moles) is dissolved in 2458 g of water and heated with stirring in a nitrogen atmosphere to 40° C. Then 904 g of 33.6% sodium hydroxide solution (7.6 moles of NaOH) is added. Over a period of 30 minutes 720 g of raw aldol is poured into this solution while it is heated to 80° C. The solution is left to after-react for 1 hour and then the phases are separated; 788 g of raw oxime with the following composition (in % by weight) is obtained:

| | |
|---|---|
| n-Butanaloxime | 25.0 |
| 2-Ethylhexenaloxime | 1.0 |
| 3-Hydroxy-2-ethylhexanaloxime | 58.8 |
| Other components | 4.4 |
| Water | 10.8 |

By using a thin-film evaporator at 130° C. and 13.3 hPa, 3-hydroxy-2-ethylhexanaloxime of approximately 95% purity is isolated from the raw oxime and used as such for extraction in the presence of an isononanol-kerosene mixture.

EXAMPLE 1

100 ml of a copper sulfate solution (Cu content: 209.7 mg corresponding to 3.3 mmoles), which has been adjusted to a pH value of 10 by adding ammonia, is extracted five times (in each case for 2 minutes), each time with 100 ml of a solution of 0.01 moles of 3-hydroxy-2-ethylhexanaloxime (about 95%) and 0.023 moles of isononanol in 94 ml of kerosene. The course of the extraction is given below:

| | Cu in the extraction solution (mg) | Cu based on feed (in %) |
|---|---|---|
| 1st stage | 124.1 | 59.2 |
| 2nd stage | 25.2 | 12.0 |
| 3rd stage | 10.7 | 5.1 |
| 4th stage | 6.2 | 2.9 |
| 5th stage | 5.2 | 2.5 |
| Total extracted: | 171.4 | 81.7 |

EXAMPLES 2 to 6

The following examples describe extraction of a copper salt solution containing 33 moles of $CuSO_4 \cdot 5H_2O$ per liter. The extracting agent used is a raw product containing about 60% by weight of 3-hydroxy-2-ethylhexanaloxime to which the solvents and solubilizers previously described have been added to further improve the hydrophobic properties.

In each case, 100 ml of the copper sulfate solution is intensively mixed five times, in each case with 100 ml of extraction solution and for 2 minutes each time. Then the phases are separated and the Cu content in the organic solution is determined.

The pH value in the copper sulfate solution is adjusted by adding ammonia. In the examples 2, 3 and 4, $Na_2SO_4$ is also added to the copper salt solution.

| Example | 2 | 3 | 4 | 5 | 6 |
|---|---|---|---|---|---|
| Cu solution (mg Cu/l) | 2097 | 2097 | 2097 | 2097 | 2097 |
| pH value | 10 | 10 | 10 | 10 | 9 |
| $Na_2SO_4$ added (mole/l) | — | 0.5 | — | 0.5 | 0.5 |
| Extraction sol. (mole/l) | | | | | |
| n-Butanaloxime | 0.12 | 0.08 | 0.16 | 0.020 | 0.04 |
| 2-Ethylhexanaloxime | 0.002 | 0.002 | 0.004 | 0.0005 | 0.001 |
| 3-Hydroxyoxime | 0.1 | 0.1 | 0.2 | 0.025 | 0.05 |
| Isononyl alcohol | 0.4 | 0.4 | 0.8 | 0.1 | to 1 l |
| Kerosene | | topped up to 1 liter | | | — |
| Cu:3-Hydroxyoxime (in moles) | 1:3 | 1:3.3 | 1:6 | 1:0.75 | 1:1.5 |
| Cu:tot. Oxime (in moles) | 1:6.7 | 1:5.5 | 1:11 | 1:1.26 | 1:2.7 |
| Organic phase | | | | | |
| 1st stage | | | | | |
| mg Cu/% of feed | 195.2 | 187.5 | 137.5 | 127.4 | 88 |
| | 98.3 | 89.7 | 65.7 | 60.9 | 42.0 |
| 2nd stage | | | | | |
| mg Cu/% of feed | 9 | 15.3 | 21.3 | 20.8 | 29 |
| | 4.3 | 7.3 | 10.2 | 9.9 | 13.8 |
| 3rd stage | | | | | |
| mg Cu/% of feed | 2.5 | 0.9 | 8.8 | 5.7 | 3.9 |
| | 1.2 | 0.4 | 4.2 | 2.7 | 1.8 |
| 4th stage | | | | | |
| mg Cu/% of feed | 1.2 | 0.8 | 6.5 | 2.2 | 0.7 |
| | 0.6 | 0.4 | 3.1 | 1.1 | 0.3 |
| 5th stage | | | | | |
| mg Cu/% of feed | 0.8 | 0.6 | 5.3 | 0.9 | 0.4 |
| | 0.4 | 0.3 | 2.5 | 0.4 | 0.2 |
| Yield | | | | | |
| mg Cu/% of feed | 208.7 | 205.1 | 179.4 | 156.9 | 122 |
| | 99.8 | 97.8 | 85.7 | 75 | 58.2 |

EXAMPLE 7

For regeneration purposes the copper-containing oxime solution is treated with an aqueous mineral acid solution. 400 ml of extraction solution (Cu content: 136.4 mg) is mixed with 500 ml of water; the pH value is adjusted to 1 by adding sulfuric acid. After 5 minutes of intensive mixing and subsequent phase separation, the aqueous solution contains 135 mg of Cu, i.e. 98.7% of the copper contained in the organic phase is recovered.

EXAMPLE 8

300 ml of regenerated oxime solution from Example 7 is intensively mixed for 5 minutes with 400 ml of a copper salt solution (Cu content: 839 mg/l ) whose pH value is 10. After a single extraction, the extraction solution contains 680.8 mg of Cu, i.e. 81.1% of the copper contained in the aqueous solution is separated.

Preparation of 3-hydroxy-2-heptylundecanaloxime 3.23 g of di-n-butylamine (0.025 moles) is stirred into distilled water in a nitrogen atmosphere and heated to 40° C. Then 710 g of n-nonanal (5 moles) and another 3.23 g of di-n-butylamine are added. The temperature rises to 50° C. After all the reactants have been added, the mixture is stirred for 1 hour at 60° C.; it is then cooled to 40° C. and the phases are separated. 713 g of raw aldol with the following composition (in % by weight, related to the mixture) is obtained:

| Di-n-butylamine | 0.4 |
|---|---|
| 2-Methyloctanal | 2.3 |
| n-Nonanal | 24.2 |
| 2-Heptylundecenal | 10.9 |
| 3-Hydroxy-2-heptylundecanal | 61.4 |
| Water | 0.8 |

Thin-film distillation of the raw aldol leads to a product with the following composition (in % by weight):

| First runnings | 1.6 |
|---|---|
| Nonanal | 15.2 |
| 2-Heptyl-2-undecenal | 12.5 |
| 3-Hydroxy-2-heptylundecanal | 70.4 |
| Tailings | 0.3 |

This product is used for preparing 3-hydroxy-2-heptylundecanaloxime.

98.5 g of hydroxylamine sulfate (0.6 moles) is dissolved in 171 g of water and heated to 40° C. in a nitrogen atmosphere with stirring. Then 120 g of 33.3% sodium hydroxide solution (1 mole of NaOH) is added. Over a period of 30 minutes, 141.8 g of aldol is poured into this solution which is simultaneously heated to 80° C. After 1 hour of after-reaction, the phases are separated. 141.3 g of raw oxime with the following composition (in % by weight) is obtained:

| Nonanaloxime | 16.1 |
|---|---|
| 2-Heptyl-2-undecenaloxime | 12.7 |
| 3-Hydroxy-2-heptylundecanaloxime | 71.2 |

This raw oxime is used for the extraction described below.

EXAMPLE 9

100 ml of a copper sulfate solution (Cu content: 209.7 mg/l , corresponding to 3.3 moles), adjusted to a pH value of 10 by adding ammonia, is extracted five times (in each case for 2 minutes), each time with 100 ml of a solution of 0.01 moles of 3-hydroxy-2-heptylundecanaloxime and 0.02 moles of isononanol dissolved in kerosene. The course of the extraction is given below:

|  | Cu in the extraction solution (mg/l) | Cu related to the feed (in %) |
|---|---|---|
| 1st stage | 130 | 61.9 |
| 2nd stage | 36.2 | 17.3 |
| 3rd stage | 24.4 | 11.6 |
| 4th stage | 13.7 | 6.5 |
| 5th stage | 5.4 | 2.5 |
| Total extracted | 209.7 | 100 |

Preparation of 2-hydroxymethyl-2-methylpentanaloxime 71.65 g of tri-n-propylamine (0.5 moles) is heated to 60° C. in a nitrogen atmosphere together with 424.5 g of formalin solution (37.1%=5.25 moles). Over a period of 20 minutes, 501 g of 2-methylpentanal (5 moles) is added and the mixture heated to 100° C. for 6 hours with return flow. After cooling to room temperature, the phases are separated. 750 g of raw aldol with the following composition (in % by weight, based on the mixture) is obtained:

| | |
|---|---|
| Formaldehyde | 1.4 |
| Tri-n-propylamine | 7.6 |
| 2-Methylpentanal | 3.9 |
| 2-Hydroxymethyl-2-methylpentanal | 74.3 |
| Component 1 | 4.4 |
| Component 2 | 3.7 |
| Water | 4.7 |

Fractional distillation of the raw aldol yields a product with the following composition (in % by weight, based on the mixture):

| | |
|---|---|
| First runnings | 3.5 |
| 2-Methylpentanal | 3.2 |
| Intermediate runnings | 3.2 |
| 2-Hydroxymethyl-2-methylpentanal | 90.1 |

This product is used for preparing 2-hydroxymethyl-2-methylpentanaloxime.

50.9 g of hydroxylamine sulfate (0.31 moles) is dissolved in 88.4 g of water and heated to 40° C. in a nitrogen atmosphere with stirring. Then, 60 g of 33.3% sodium hydroxide solution (0.5 moles) is added. Over a period of 30 minutes, 72.2 g of the aldol fraction (0.5 moles) is poured into this solution which is simultaneously heated to 80° C. After the solution has been left to after-react for 1 hour, the phases are separated. 88.7 g of raw oxime with the following composition (in % by weight) is obtained:

| | |
|---|---|
| First runnings | 0.2 |
| 2-Methylpentanaloxime | 2.9 |
| 2-Hydroxymethyl-2-methylpentanal | 2.2 |
| Intermediate runnings | 5.3 |
| 2-Hydroxymethyl-2-methylpentanaloxime | 80.5 |
| Water | 8.9 |

EXAMPLE 10

100 ml of a copper sulfate solution (Cu content: 203.7 mg/l, corresponding to 3.3 mmoles), adjusted to a pH value of 10 by adding ammonia, is extracted five times (in each case for 2 minutes), each time with 100 ml of a solution of 0.01 moles of 2-hydroxymethyl-2-methylpentanaloxime and 0.02 moles of isononanol in kerosene. The course of the extraction is given below:

| | Cu in the extraction solution (mg/l) | Cu related to the feed (in %) |
|---|---|---|
| 1st stage | 130 | 61.3 |
| 2nd stage | 7.6 | 3.6 |
| 3rd stage | 2.8 | 1.3 |
| 4th stage | 1.6 | 0.8 |
| 5th stage | 1.0 | 0.5 |
| Total extracted: | 143 | 68.2 |

What we claim is:

1. A process for the extraction of copper comprising contacting a solution consisting essentially of an aqueous basic solution of copper wherein the copper concentration is 0.1 to 1.0% by weight of the basic solution at a pH of 8 to 12 with an extraction solution of an oxime in a water-immiscible solvent, said oxime being of the formula $$H(CH_2)_n-CH(OH)-CH(R)-CH(=NOH)$$

or $$H(CH_2)_n-C(R)-CH(=NOH)$$
$$|$$
$$CH_2OH$$

wherein R is an alkyl group having 1 to 8 carbon atoms and n is an integer from 2 to 10, thereby forming a copper-containing oxime solution.

2. The process of claim 1 wherein said oxime is selected from the group consisting of 3-hydroxy-2-ethylhexanaloxime, 3-hydroxy-2-heptylundecanaloxime, and 2-hydroxymethyl-2-methylpentanaloxime.

3. The process of claim 1 wherein said water-immiscible solvent is selected from the group consisting of aliphatic hydrocarbons, crude oil fractions boiling between about 175° and about 325° C., aromatic hydrocarbons, chlorinated hydrocarbons, and higher alcohols.

4. The process of claim 3 wherein said aliphatic hydrocarbons are selected from the group consisting of hexane and heptane; said aromatic hydrocarbons are selected from the group consisting of benzene, toluene, and xylene; said chlorinated hydrocarbons are selected from the group consisting of chloroform, carbon tetrachloride, and dichloroethane; and said higher alcohols are selected from the group consisting of n-octanol, isooctanol, isononanol, decanol, and isotridecanol.

5. The process of claim 4 wherein said water-immiscible solvent is selected from the group consisting of isononanol and isotridecanol.

6. The process of claim 1 wherein said oxime is present in said extraction solution in an oxime amount of 0.02 to 2.0 moles per liter.

7. The process of claim 6 wherein said oxime amount is 0.1 to 0.15 moles per liter.

8. The process of claim 1 wherein said extraction solution contains a solubilizer for said oxime.

9. The process of claim 8 wherein said solubilizer is selected from the group consisting of aliphatic alcohols having 6 to 18 carbon atoms.

10. The process of claim 9 wherein said solubilizer is selected from the group consisting of hexanol, n-octanol, i-octanol, i-nonanol, decanol, and i-tridecanol.

11. The process of claim 8 wherein said solubilizer is present in said extraction solution in a solubilizer amount of 1% to 25% by weight based on said extraction solution.

12. The process of claim 11 wherein said solubilizer amount is 2% to 10%.

13. The process of claim 1 wherein said water immiscible solvent is a mixture of hydrocarbons and aliphatic alcohols having 6 to 18 carbon atoms.

14. The process of claim 1 wherein said copper is in the form of a salt.

15. The process of claim 1 wherein said solution pH is 9 to 10.

16. The process of claim 1 wherein, prior to said extraction, an initial pH of a precursor solution containing said copper is adjusted to form said basic solution.

17. The process of claim 16 wherein said initial pH is adjusted upwards by addition of ammonia.

18. The process of claim 16 wherein said initial pH is adjusted downward by addition of a precursor mineral acid.

19. The process of claim 18 wherein said mineral acid is sulfuric acid.

20. The process of claim 1 wherein the volume ratio of water-immiscible solution to basic solution is 1:10 to 5:1.

21. The process of claim 22 wherein said ratio is approximately 1:1.

22. The process of claim 1 wherein said extraction is carried out at an extraction temperature of 15° to 60° C.

23. The process of claim 22 wherein said extraction temperature is 20° to 40° C.

24. The process of claim 1 wherein said copper is recovered from said copper-containing oxime solution by contact of said oxime solution with a dilute aqueous recovery mineral acid solution to form a copper-containing phase and an oxime phase.

25. The process of claim 24 wherein said recovery mineral acid solution has an acid pH of less than 2.

26. The process of claim 25 wherein said acid pH is approximately 1.

27. The process of claim 24 wherein said contact is repeated at least once.

28. The process of claim 24 wherein said recovery mineral acid is selected from the group consisting of hydrochloric acid, sulfuric acid, phosphoric acid, and nitric acid.

29. The process of claim 28 wherein said recovery mineral acid is sulfuric acid.

30. The process of claim 24 wherein said dilute solution contains a solution amount of 0.1 to 3.0 moles of said recovery mineral acid per liter of said dilute solution.

31. The process of claim 24 wherein said contact is at a contact temperature of 10° to 30° C.

32. The process of claim 31 wherein said contact temperature is 15° to 25° C.

33. The process of claim 30 wherein said solution amount is 1.5 to 2.0 moles per liter.

34. The process of claim 33 wherein said solution amount is 0.3 to 0.7 moles per liter.

35. The process of claim 1 wherein said extraction solution comprises a tertiary carboxylic acid of the formula $$R^1R^2C(CH_3)COOH$$

wherein $R^1$ is an alkyl radical having 1 to 3 carbon atoms and $R^2$ is an alkyl radical having 3 to 5 carbon atoms.

36. The process of claim 14 wherein said salt is a sulfate.

37. The process of claim 24 wherein said oxime phase is reused to extract copper from another aqueous basic solution.

* * * * *